United States Patent
Yang et al.

(10) Patent No.: US 11,792,722 B2
(45) Date of Patent: Oct. 17, 2023

(54) UNMANNED AERIAL VEHICLE DETECTION, SLICE ASSIGNMENT AND BEAM MANAGEMENT

(71) Applicant: Verizon Patent and Licensing Inc., Basking Ridge, NJ (US)

(72) Inventors: Jin Yang, Orinda, CA (US); Lalit R. Kotecha, San Ramon, CA (US); Donna L. Polehn, Mercer Island, WA (US); Arda Aksu, Lafayette, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 228 days.

(21) Appl. No.: 16/984,451

(22) Filed: Aug. 4, 2020

(65) Prior Publication Data
US 2022/0046528 A1 Feb. 10, 2022

(51) Int. Cl.
*H04W 48/18* (2009.01)
*H04W 72/044* (2023.01)
*B64C 39/02* (2023.01)
*H04W 72/51* (2023.01)
*B64U 10/13* (2023.01)

(52) U.S. Cl.
CPC .......... *H04W 48/18* (2013.01); *B64C 39/024* (2013.01); *H04W 72/046* (2013.01); *H04W 72/51* (2023.01); *B64U 10/13* (2023.01)

(58) Field of Classification Search
CPC . H04W 48/18; H04W 72/046; H04W 72/048; H04W 24/02; B64C 39/024; B64C 2201/027; H04B 7/088; H04B 7/0695
See application file for complete search history.

(56) References Cited

U.S. PATENT DOCUMENTS

| | | | |
|---|---|---|---|
| 2015/0095413 A1* | 4/2015 | Wei | H04W 36/0022 709/203 |
| 2017/0039860 A1* | 2/2017 | Just | G01S 3/26 |
| 2018/0005535 A1* | 1/2018 | Kalathil | G01S 1/7038 |
| 2018/0332441 A1* | 11/2018 | Shaw | H04W 36/26 |
| 2019/0212724 A1* | 7/2019 | Phuyal | G05D 1/0022 |
| 2019/0277957 A1* | 9/2019 | Chandrasekhar | G01S 5/017 |
| 2020/0100176 A1* | 3/2020 | Pateromichelakis | H04W 48/06 |
| 2020/0394928 A1* | 12/2020 | Neubauer | G08G 5/0013 |
| 2022/0200672 A1* | 6/2022 | Nonaka | H04L 5/005 |

* cited by examiner

Primary Examiner — Steven H Nguyen

(57) ABSTRACT

A method may include transmitting multiple antenna beams to an unmanned aerial vehicle (UAV) and determining a location of the UAV. The method may also include identifying a network slice to service the UAV, assigning the identified network slice to the UAV and performing antenna beam management for the UAV while the UAV is in flight.

20 Claims, 9 Drawing Sheets

UNMANNED AERIAL VEHICLE DETECTION, SLICE ASSIGNMENT AND BEAM MANAGEMENT

BACKGROUND INFORMATION

The use of Unmanned Aerial Vehicles (UAVs), also referred to as drones, is dramatically increasing. For example, UAVs are more frequently being used for both recreational and business purposes, such as obtaining aerial images, delivering packages, etc. In some instances, the UAVs may communicate with a network to send/receive information to/from other devices and systems, such as image data from a camera included on the UAV, command data for controlling the UAV and telemetry data associated with the UAV's flight. As a result, providing reliable data services to UAVs while in flight is becoming increasingly important.

DETAILED DESCRIPTION OF PREFERRED EMBODIMENTS

The following detailed description refers to the accompanying drawings. The same reference numbers in different drawings may identify the same or similar elements.

Implementations described herein provide systems and methods for detecting UAVs and assigning network slices to the UAVs to provide network services. The particular network slice assigned to a UAV may be based on, for example, the type and/or usage associated with the UAV, a quality of service (QoS) or service level agreement (SLA) metric for a subscriber associated with the UAV. Implementations described herein may also perform antenna beam management, while a UAV is flying, to ensure that the UAV has network connectivity during the flight. In some implementations, a service provider may provide antenna beam management based on historical data associated with UAV flights as well as use machine learning to identify the appropriate antenna beam from the appropriate base station to provide reliable connectivity to the UAV. In this manner, UAVs may be provided with reliable network services while in flight, while also optimizing use of network resources.

Figure 1:
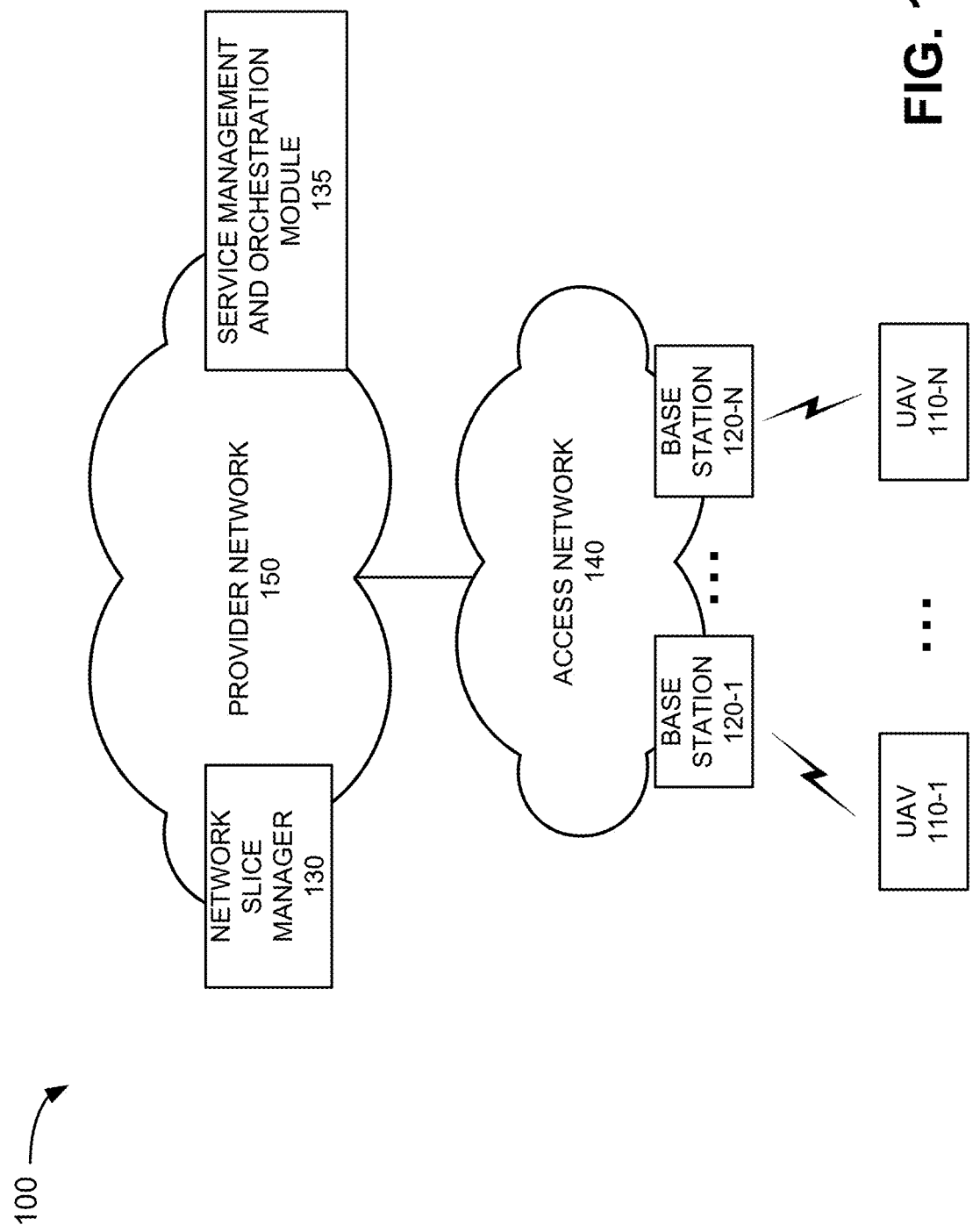
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes UAVs 110-1 to 110-N (referred to collectively as UAVs 110 and individually as UAV 110), base stations 120-1 to 120-N (referred to collectively as base stations 120 and individually as base station 120), network slice manager 130, service management and orchestration module 135, access network 140 and provider network 150.

UAVs 110 may each include an aircraft (e.g., a single rotor aircraft, multirotor aircraft or fixed wing aircraft) that receives control signals from a controller, such as a user device (not shown) to control the flight of UAV 110. In some implementations, UAV 110 may include cellular communication capability (e.g., fifth generation (5G) communication capability, fourth generation long term evolution (4G LTE) communication capability, etc.) to allow UAV 110 to receive and transmit data and information (e.g., receive commands from a remotely located control device (not shown) to control the flight, transmit aerial images to a remotely located device, etc.). UAV 110 may also include a short range wireless communication capability (e.g., WiFi) to allow UAV 110 to receive data from and transmit data to devices and systems located relatively close to UAV 110.

Base stations 120 may be associated with a communication network, such as a 5G network, a 4G LTE network, etc. Each base station 120 may service a set of user equipment (UE) devices that include UAVs 110. For example, base stations 120 may be part of a radio access network (RAN) that connects UAVs 110 to a provider network 150, to allow UAVs 110 to receive telephone, data and multi-media data services.

In one implementation, base station 120 may include a 5G base station (e.g., a next generation NodeB (gNB)) that includes one or more radio frequency (RF) transceivers. For example, base station 120 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams, as described in detail below. In some implementations, base station 120 may also include a 4G base station (e.g., an evolved NodeB (eNodeB)) that communicates wirelessly with UE devices, such as UAVs 110 located within the service range of base station 120.

Network slice manager 130 may include computer devices, functions and/or logic devices to assign and manage the provisioning of network slices in environment 100. For example, using network slicing, network slice manager 130 may section or "slice" a physical network into multiple, virtual, end-to-end networks. Each network slice may be associated with a different type of services having different characteristics and requirements (e.g., latency, jitter, bandwidth, etc.). The term "network slice" or "slice" as used herein refers to a logical network including a RAN (e.g., a portion of access network 140) and a core network (e.g., a portion of provider network 150) that provides telecommunication services and network capabilities that can vary from slice to slice. Network slice manager 130 may provision network slices to UAVs 110 to provide network connectivity and data services for UAVs 110, as described in detail below.

Service management and orchestration (SMO) module 135 may include computer devices and/or logic to manage and assign resources, such as RAN resources to support UAVs 110. In an exemplary implementation, SMO module 135 may use historical data associated with flights of UAVs 110 and determine appropriate base stations 120 and beams from the base stations 120 to support network connectivity during the flight of UAVs 110. In some implementations, SMO module 135 may use artificial intelligence/machine learning to identify the appropriate base stations 120 and beams to support UAVs 110 during flights, as described in detail below.

Access network 140 may include a RAN that includes base stations 120. Base stations 120, as described above, may service UEs, such as UAVs 110 in environment 100. Access network 140 may provide a connection between UAVs 110 and provider network 150.

Provider network 150 may include one or more wired, wireless and/or optical networks that are capable of receiving and transmitting data, voice and/or video signals. For example, network 160 may include one or more public switched telephone networks (PSTNs) or other type of switched network. Provider network 150 may further include one or more satellite networks, one or more packet switched networks, such as an Internet protocol (IP) based network, a software defined network (SDN), a local area network (LAN), a WiFi network, a Bluetooth network, a wide area network (WAN), a 5G network, a 4G LTE Advanced network, an intranet, or another type of network that is capable of transmitting data. Provider network 150 may include a core network that provides packet-switched services and wireless Internet protocol (IP) connectivity to various components in environment 100, such as UAVs 110, to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., hundreds or more) of UAVs 110, user devices that control UAVs 110 (not shown), as well as multiple network slice managers 130 and SMO modules 135. Environment 100 may also include elements, such as gateways, routers, monitoring devices, network elements/ functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device. For example, in some implementations, network slice manager 130 may include multiple elements/functions, such as an access and mobility management function (AMF), a network slice selection function (NSSF) and other functions of a 5G network or functions of a 4G LTE network used to provision network slices, as described in detail below.

Figure 2:
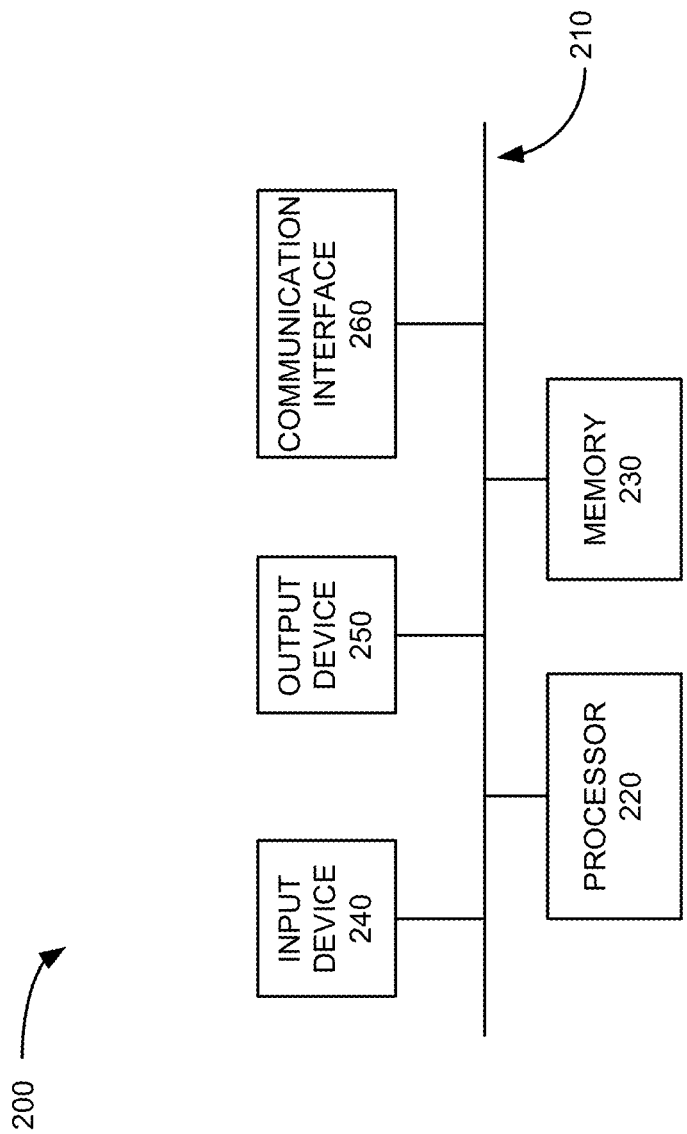
FIG. 2 is a block diagram of components implemented in one or more of the elements of the environment of FIG. 1 in accordance with an exemplary implementation.

FIG. 2 illustrates an exemplary configuration of a device 200. One or more devices 200 may correspond to or be included in UAV 110, base station 120, network slice manager 130, SMO module 135 and/or other devices included in environment 100. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for simplicity. It should be understood that device 200 may include more or fewer components than illustrated in FIG. 2. For example, for device 200 implemented in UAV 110, device 200 may include a positioning system/satellite navigation system, such as a global positioning system (GPS) component, which may provide position information in relation to a standard reference frame, sensors and control circuitry to control and/or monitor the flight of UAV 110.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD), etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
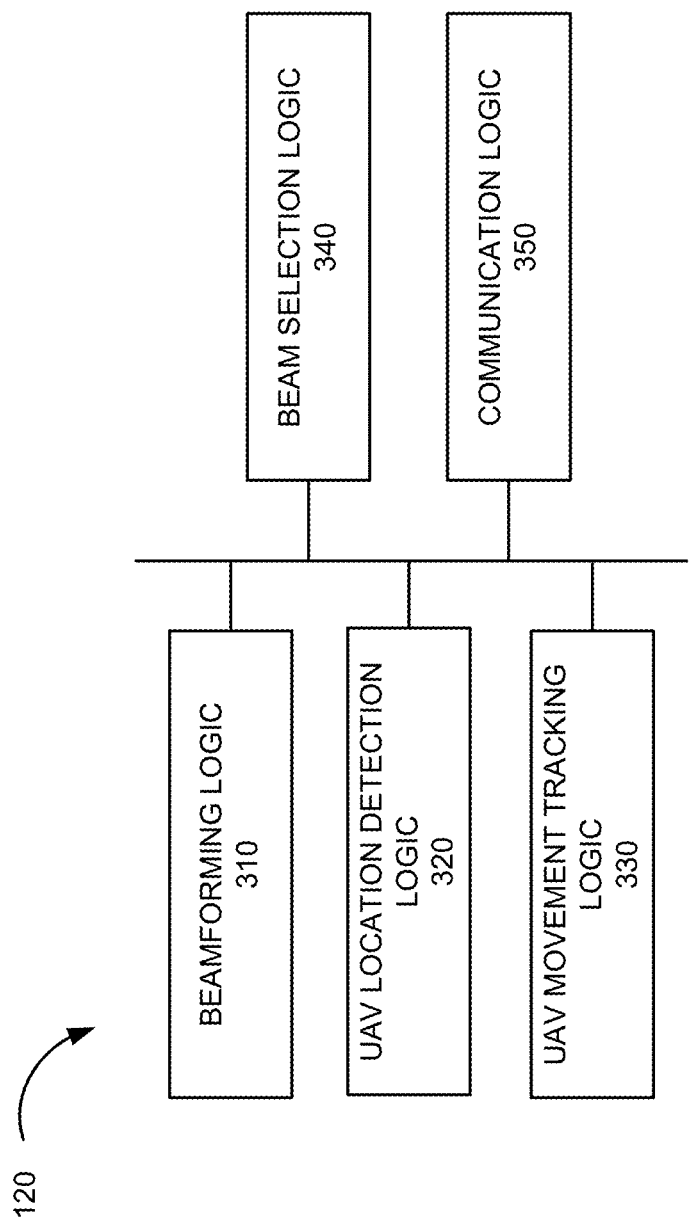
FIG. 3 illustrates exemplary logic components implemented in a base station of FIG. 1 in accordance with an exemplary implementation.

FIG. 3 is a functional block diagram of components implemented in base station 120 in accordance with an exemplary implementation. Referring to FIG. 3, base station 120 may include beamforming logic 310, UAV location detection logic 320, UAV movement tracking logic 330, beam selection logic 340 and communication logic 350. These elements may be implemented by processor 220 executing instructions stored in memory 230 of base station 120. In alternative implementations, these components or a portion of these components may be located externally with respect to base station 120.

Figure 4:
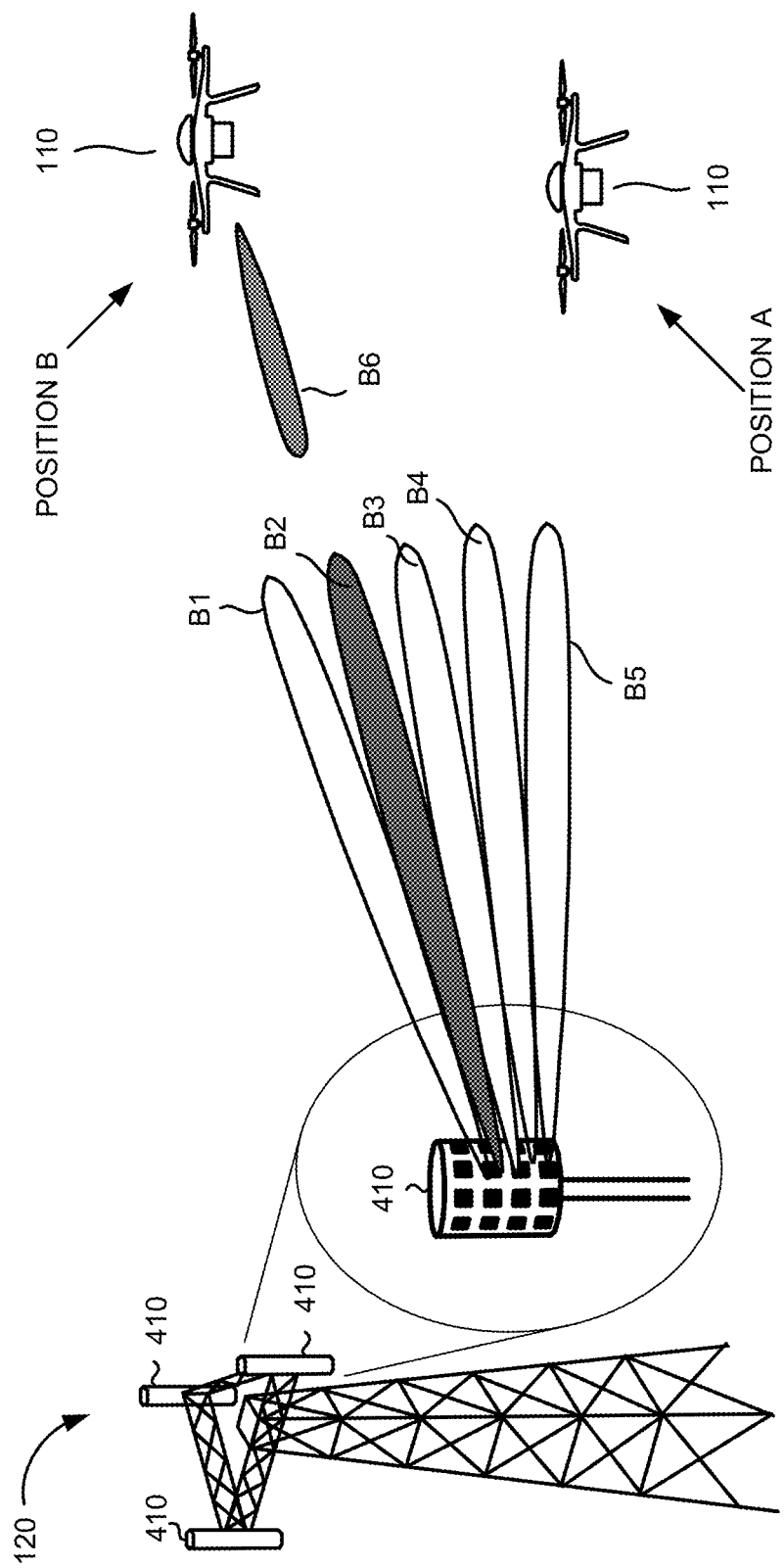
FIG. 4 illustrates exemplary antenna beams transmitted in the environment of FIG. 1 in accordance with an exemplary implementation.

Beamforming logic 310 may include one or more logic devices to generate antenna beams using an antenna array located on base station 120. The term "antenna beam" or "beam" as used herein refers to a radiation pattern focused in a particular direction. For example, FIG. 4 illustrates exemplary antenna beams generated by beamforming logic 310 according to an implementation described herein. Referring to FIG. 4, base station 120 may include one or more antenna arrays 410. For example, base station 120 may include three antenna arrays 410 that each cover a 120 degree sector with respect to base station 120. Each antenna array 410 may include an array of controllable antenna elements configured to send and receive, for example, 5G new radio (NR) wireless signals. The antenna elements may be digitally controllable to electronically tilt or steer an antenna beam in a vertical direction and/or horizontal direction. In some implementations, the antenna elements may additionally be controllable via mechanical tilting or steering using one or more actuators associated with each antenna element.

Each base station sector associated with each antenna array 410 may service k UE devices, such as UAVs 110. For example, in an exemplary implementation, beamforming logic 310 may simultaneously generate k antenna beams for each antenna array 410, with five beams associated with one antenna array 410 labeled B1-B5 shown in FIG. 4 for simplicity. It should be understood that beamforming logic 310 may generate additional antenna beams for each antenna array 410. Each antenna beam B1-B5 may service one or more UAVs 110. For example, beam B2 may service UAV 110 while UAV 110 is located at position B illustrated in FIG. 4. Position B may be associated with UAV 110 in flight, while position A for UAV 110 may be associated with UAV 110 located on the ground. Antenna beam B2 may represent the beam having the highest signal quality (e.g., received power) as determined by UAV 110. UAV 110 may also generate one or more antenna beam directed toward base station 130, such as beam B6 illustrated in FIG. 4.

Referring back to FIG. 3, UAV location detection logic 320 may include logic to detect the location (e.g., latitude, longitude, elevation above sea level) of UAVs 110. For example, based on the particular beam selected by UAV 110 and communicated to base station 120, UAV location detection logic 320 may determine the location of UAV 110. As an example, if beam B2 is selected by UAV 110 as the beam with the highest signal strength, UAV location detection logic 320 uses the known angle at which beam B2 is transmitted and the received signal strength measured by UAV 110 to determine the latitude, longitude and the elevation above sea level for UAV 110. In some implementations, the location, as well as the speed and direction in which UAV 110 is flying may be determined using timing advance (TA) information transmitted to base station 120. As described above, in some implementations, a global positioning system (GPS) may be included on UAV 110. In such implementations, UAV 110 may transmit its location and elevation to base station 120.

UAV movement tracking logic 330 may include logic to track the movement of UAV 110. For example, UAV movement tracking logic 330 may determine the speed at which UAV 110 is moving, the direction of movement for UAV 110, and/or the distance of the particular UAV device 110 from base station 120 based on, for example, information obtained from UAV 110, such as the current signal strength associated with one or more of beams B1-B5 and/or the current antenna beam being used by the particular UAV 110. For example, UAV movement tracking logic 330 may determine the area covered by each generated antenna beam based on the angle/direction and width of each generated antenna beam. UAV movement tracking logic 330 may also receive from UAV 110 the beam ID and signal strength associated with the beam selected by UAV 110. UAV movement tracking logic 330 may then determine the speed, direction, and/or distance of the particular UAV 110 from base station 120 based on the beam ID and signal strengths of particular antenna beams measured by the particular UAVs 110. For example, using the received signal strength value from UAV 110 may allow UAV movement tracking logic 330 to identify the location of UAV 110 at various points in time. From the location at various points in time, UAV movement tracking logic 330 may determine the speed and direction at which UAV 110 is flying. In other implementations, UAV movement tracking logic 330 may determine the speed and direction at which UAV 110 is flying using GPS information transmitted to base station 120 by UAV 110.

Beam selection logic 340 may include logic to select different antenna beam patterns based on the changing speed and direction of movement, and/or distance from base station 120, of UAV 110. Beamforming logic 310 may then adjust the antenna beams, generated by antenna array 410 based on the selected antenna beam patterns. For example, beam selection logic 340 may determine that UAV 110 is moving at a relatively high speed (e.g., a speed above a threshold value). In this case, beam selection logic 340 may then determine that UAV 110 should be serviced using a wider beam than the beam currently servicing UAV 110 and signal beamforming logic 310 to provide a wider antenna beam to service UAV 110. Similarly, if UAV 110 begins moving at a slower speed or becomes relatively stationary, beam selection logic 340 may signal beamforming logic 310 to generate a narrower beam to service UAV 110. Using wider beams during a flight may help avoid intra-beam handoffs while UAV 110 is in flight. In addition, favorable line of sight (LOS) conditions during a flight enable use of wider antenna beams in an efficient manner with respect to use of base station 120 resources.

Communication logic 350 may include logic for communicating with devices in environment 100. For example, communication logic 350 may transmit data to and receive data from UAV 110, network slice manager 130 and/or SMO module 135. Communication logic 350 may also communicate with other base stations 120, routers and other devices in access network 140 and provider network 150.

Although FIG. 3 shows exemplary components of base station 120, in other implementations, base station 120 may include fewer components, different components, differently arranged components, or additional components than depicted in FIG. 3. In addition, in some implementation, various functions described as being performed by base station 120 may be performed by other devices located externally with respect to base station 120, such as by a self-organizing network (SON) system/function and/or applications server that may communicate with base station 120, as well as communicate with other devices in access network 140 and provider network 150.

Figure 5:
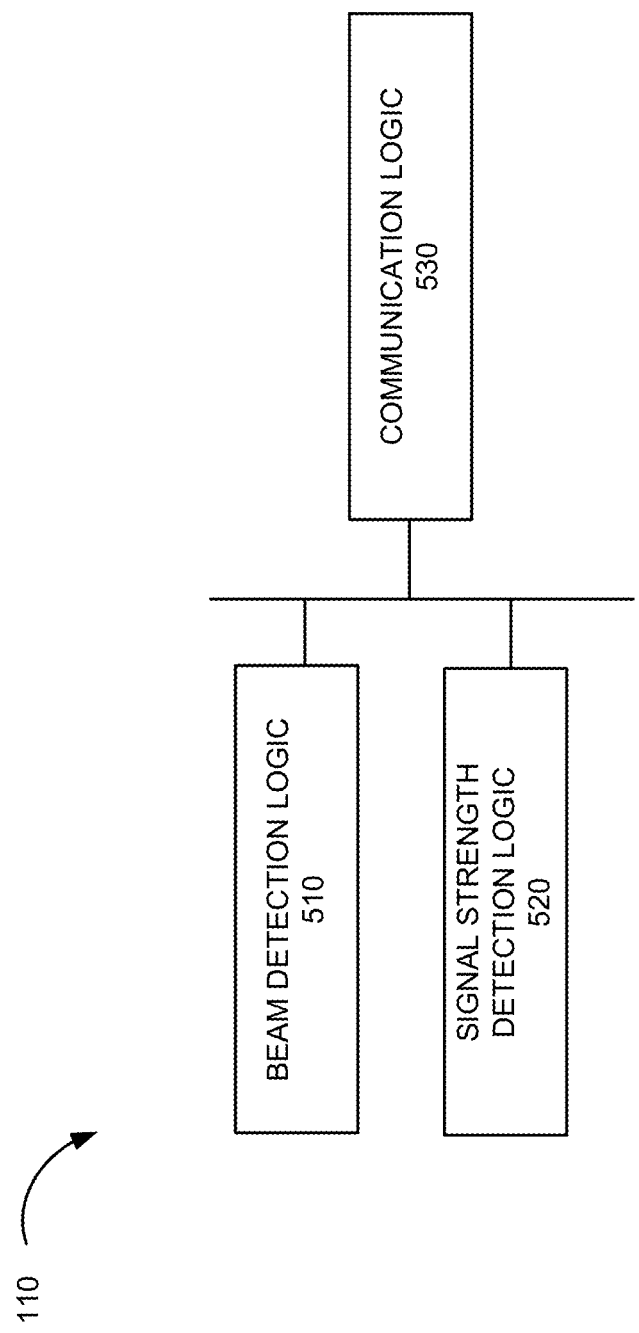
FIG. 5 illustrates exemplary logic components implemented in a UAV of FIG. 1 in accordance with an exemplary implementation.

FIG. 5 is a functional block diagram of components implemented in UAV 110 in accordance with an exemplary implementation. Referring to FIG. 5, UAV 110 may include beam detection logic 510, signal strength detection logic 520 and communication logic 530. These elements may be implemented by processor 220 executing instructions stored in memory 230 of UAV 110. In alternative implementations, these components or a portion of these components may be located externally with respect to UAV 110.

Beam detection logic 510 may include logic to detect antenna beams transmitted by base station 120. For example, referring to FIG. 4, beam detection logic 510 may detect one or more of antenna beams B1-B5. In an exemplary implementation, antenna beams B1-B5 may include beam identifiers (IDs) associated with each of the transmitted beams. Beam detection logic 510 may detect one or more of antenna beams B1-B5 and identify the particular detected antenna beam using the beam identifier.

Signal strength detection logic 520 may include logic to detect the signal strength associated with antenna beams transmitted by base station 120 and received by UAV 110. For example, signal strength detection logic 520 may measure a variation in the channel quality. The channel quality may be measured, for example, using a channel quality indicator (CQI) value, a signal-to-noise ratio (SNR) value, a signal-to-interference-plus-noise ratio (SINR) value, a block error rate (BLER) value, a Received Signal Strength Indication (RSSI) value, a Reference Signal Received Quality (RSRQ) value, a Reference Signal Received Power (RSRP) value, and/or using another measure of signal strength or quality. The received signal strength may be transmitted to base station 120 along with the corresponding beam ID, as described in more detail below Communication logic 530 may include one or more transceivers that UAV 110 uses to communicate with other devices via wired, wireless or optical mechanisms. For example, communication logic 530 may include one or more RF transmitters, receivers and/or transceivers and one or more antennas for transmitting and receiving RF data. Communication logic 530 may also include a modem or an Ethernet interface to a LAN or other mechanisms for communicating with elements in a network.

Although FIG. 5 shows exemplary components of UAV 110, in other implementations, UAV 110 may include fewer components, different components, differently arranged components, or additional components than depicted in FIG. 5.

Figure 6:
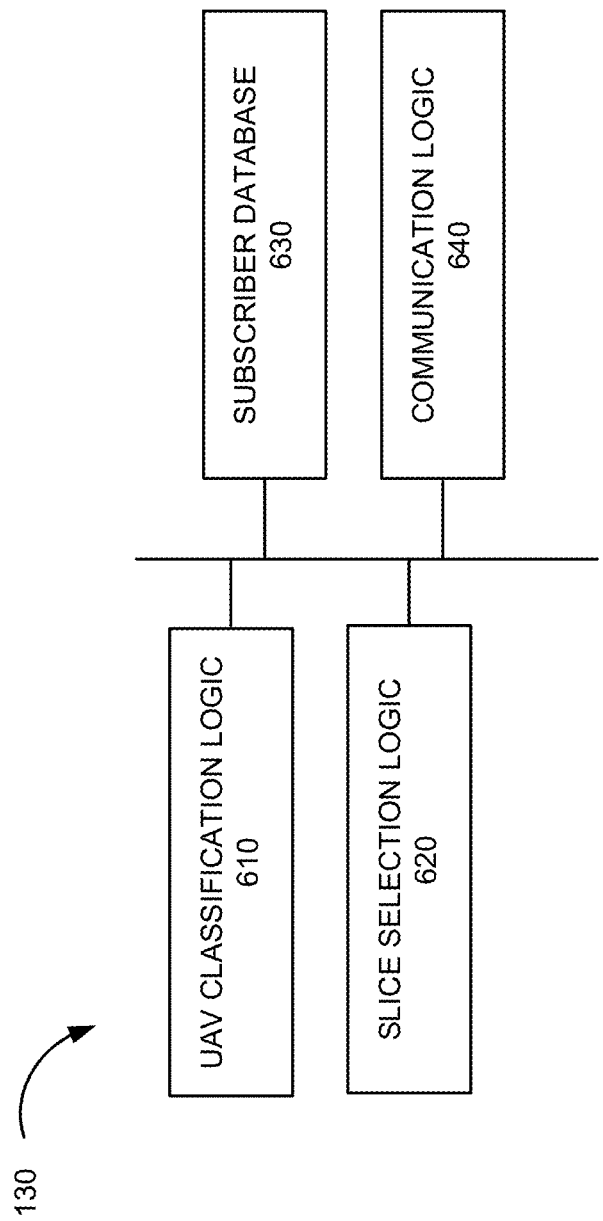
FIG. 6 illustrates exemplary logic components implemented in the network slice manager of FIG. 1 in accordance with an exemplary implementation.

FIG. 6 is a functional block diagram of components implemented in network slice manager 130 in accordance with an exemplary implementation. Referring to FIG. 6, network slice manager 130 may include UAV classification logic 610, slice selection logic 620, subscriber database 630 and communication logic 640. These elements may be implemented by processor 220 executing instructions stored in memory 230 of network slice manager 130. In alternative implementations, these components or a portion of these components may be located externally with respect to network slice manager 130.

UAV classification logic 610 may include logic to identify types of UAVs 110 and classify the UAVs 110. For example, UAV classification logic 610 may identify UAVs 110 based on, for example, the type and/or usage associated with the UAV 110, a quality of service (QoS) metric or service level agreement (SLA) metric associated with a subscriber associated with the UAV 110, etc. For example, UAV classification logic 610 may identify UAVs 110 associated with commercial uses, such as the delivery of packages, taking aerial photographs for a business purpose (e.g., for a realtor), emergency uses (e.g., for a hospital), etc. UAV classification logic 610 may also identify UAVs 110 associated with recreational flying, etc. The classification regarding business or recreational purposes may be made based on a UAV identifier that identifies the type/purpose of UAVs 110. UAV classification logic 610 may also access subscriber database 630 to identify a QoS, SLA or other requirement or metric associated with a subscriber flying one or more UAVs 110. UAV classification logic 610 may then classify the UAVs 110 in different categories based on their types, uses, and/or QoS or SLA metrics, etc.

Slice selection logic 620 may include logic to select network slices to service UAVs 110. For example, slice selection logic 620 may select a slice for a UAV 110 based on information generated by UAV classification logic 610. For example, slice selection logic 620 may identify a slice that has a very low latency to service a particular UAV 110 that is performing an important task, such as delivering equipment or being used for another commercial purpose, and identify a slice having higher latency, jitter, etc., for a UAV 110 that is used or recreational purposes. Slice selection logic 620 may also access subscriber database 630 to identify a QoS level or SLA associated with a party who has subscribed to particular levels of service (e.g., bandwidth requirement, latency, jitter) associated with one or more UAVs 110 owned/operated by the subscriber.

Subscriber database 630, as described above, may identify entities/parties, and their corresponding UAVs 110, that have subscribed to particular levels of service associated with providing telecommunications services for their UAVs 110. For example, an entity flying a commercial fleet of UAVs 110 may subscribe to telecommunication services provided by a service provider associated with provider network 150 and access network 140. For example, the entity may contract with the service provider to provide certain QoS and/or SLA requirements associated with connectivity and data services provided to UAVs 110.

Communication logic 640 may include logic for communicating with devices in environment 100 via wired, wireless or optical mechanisms. For example, communication logic 640 may transmit data to and receive data from UAV 110, base stations 120 and SMO module 135. Communication logic 640 may also communicate with other devices in access network 140 and provider network 150. For example, communication logic 640 may include one or more transceivers and one or more antennas for transmitting and receiving RF data, a modem or an Ethernet interface to a LAN or other mechanisms for communicating with elements in a network.

Although FIG. 6 shows exemplary components of network slice manager 130, in other implementations, network slice manager 130 may include fewer components, different components, differently arranged components, or additional components than depicted in FIG. 6. For example, in some implementations, slice manager 130 may include or communicate with various functions of a 5G core network, such as an AMF function, an NSSF function, etc., to perform functions described herein.

Figure 7:
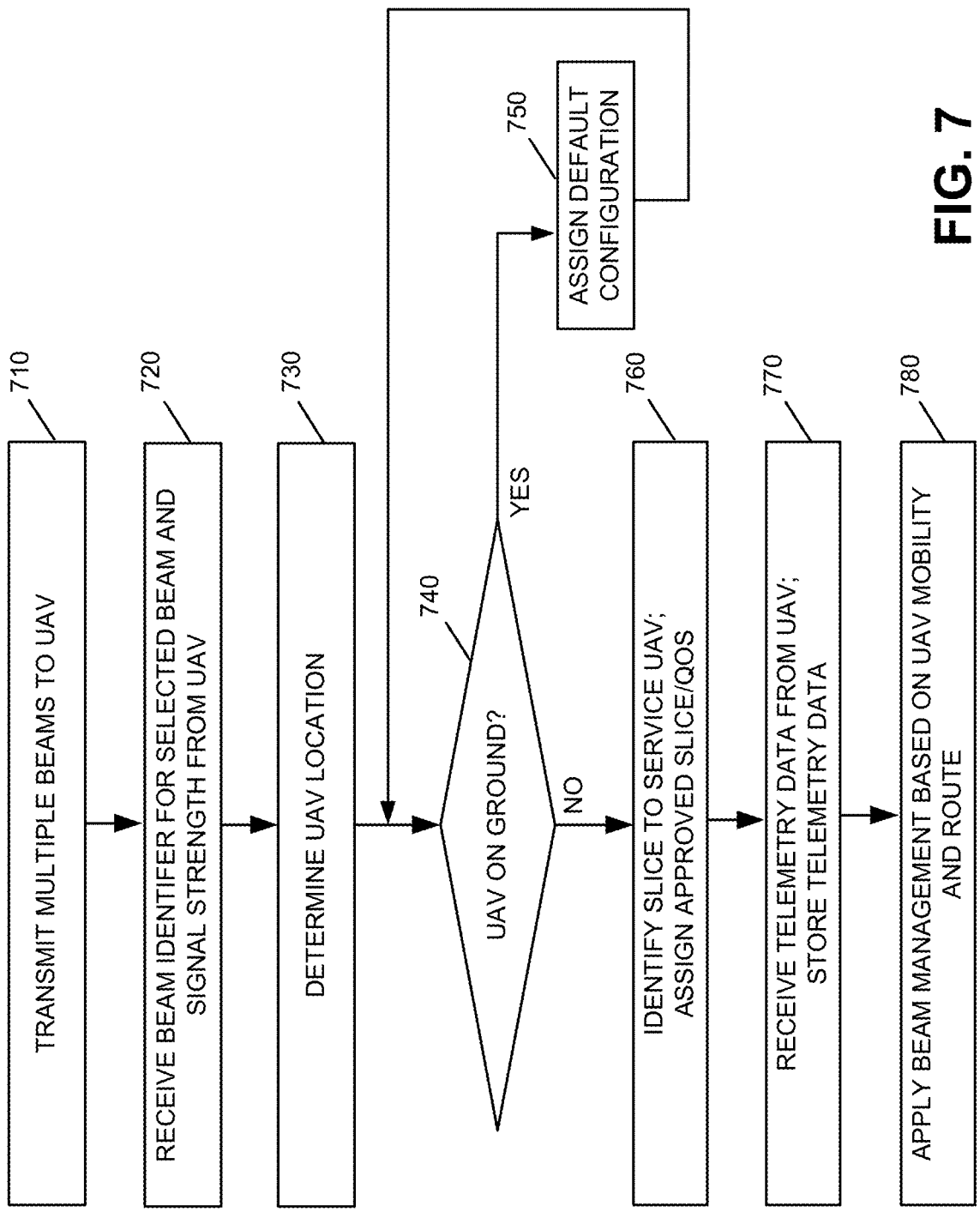
FIG. 7 is a flow diagram illustrating processing associated with performing slice selection and beam management in accordance with an exemplary implementation.

FIG. 7 is a flow diagram illustrating processing associated with environment 100 in accordance with an exemplary implementation. Processing may begin with one of base stations 120 establishing a connection with UAV 110. For example, beamforming logic 310 of base station 120-1 may transmit multiple antenna beams, such as beams B1-B5 from antenna array 410, as illustrated in FIG. 4 (block 710). Each beam may include a beam ID. UAV 110 may identify the best beam with which to receive communications from base station 120 (e.g., the beam having the highest signal strength).

For example, assume that beam detection logic 510 of UAV 110 receives the beam corresponding to beam B2 and signal strength detection logic 520 determines that the signal strength of beam B2 is the highest of beams B1-B5. In this case, beam selection logic 510 may select beam B2 as the beam with which to receive communications from base station 120. UAV 110 may transmit a signal to base station 120-1 identifying beam B2, based on the beam ID, and also provide the signal strength associated with the received beam B2. Base station 120-1 may receive the beam ID and corresponding signal strength (block 720). Base station 120-1 may then use the beam ID and signal strength to determine the location of UAV 110 (block 730).

For example, based on the known angle at which beam B2 is transmitted from antenna array 410 and the signal strength of beam B2 received by UAV 110, and communicated to base station 120-1, base station 120-1 may determine the geographical location and altitude of UAV 110 (block 730). For example, UAV location detection logic 320 may determine the latitude and longitude coordinates of UAV 110, as well as the elevation above sea level. As described above, in other implementations, UAV location detection logic 320 may receive GPS information from UAV 110 identifying the latitude, longitude and elevation above sea level.

In each case, UAV location detection logic 320 may determine if UAV 110 is located on the ground (block 740). For example, based on the altitude above sea level and the known altitude of base station 120, UAV location detection logic 320 may determine that UAV 110 is located on the ground or in the air. If UAV location detection logic 320 determines that UAV 110 is located on the ground (e.g., position A in FIG. 4) (block 740—yes), base station 120 may signal network slice manager 130 that UAV 110 is on the ground/not flying. In this case, network slice manager 130 may assign a default slice configuration, such as an enhanced mobile broadband (eMBB) slice to UAV 110. Such a slice may provide adequate network services to UAV 110 while UAV 110 is not flying and likely to not be receiving and/or transmitting large amounts of data.

If, however, UAV location detection logic 320 determines that UAV 110 is not on the ground, such as at location B illustrated in FIG. 4 (block 740—no), based on the elevation and/or selected beam servicing UAV 110, network slice manager 130 may identify a particular slice to service UAV 110 (block 760). For example, based on the particular type of UAV 110 identified by UAV classification logic 610 (e.g., commercial UAV 110, recreational UAV 110), the particular usage associated with UAV 110 (e.g., delivering packages, recreational use, etc.) and/or QoS parameters, SLA parameters etc., associated with a subscriber associated with UAV 110, slice selection logic 620 may select an appropriate slice to support UAV 110 while UAV 110 is in flight. Slice manager 130 may then assign UAV 110 to the selected slice (block 760).

Assume that UAV 110 is flying. UAV 110 may transmit telemetry information to base station 120 in real time while in flight. Base station 120 may receive the telemetry information and forward the telemetry information to network slice manager 130 (block 770). Base station 120 and/or slice manager may store the telemetry data (block 770). The telemetry information may be used to train a model associated with tracking UAVs 110, as described in more detail below.

Base station 120 may also apply beam management based on UAV 110's mobility and route (block 780). For example, base station 120 may determine that UAV 110 is flying at a relatively high speed and that a wider antenna beam is needed to support UAV 110, as opposed to using a narrower beam when UAV 110 is flying slower. In each case, base station 120 may provide the appropriate antenna beams to support UAVs 110 while in flight, as described in more detail below. Base station 120 may also set automatic neighbor relations (ANR) with other base stations 120 based on the mobility and route of UAV 110. For example, base station 120 may determine signal strengths of neighboring base stations 120 in a direction corresponding to the UAV 110's flight path.

Figure 8:
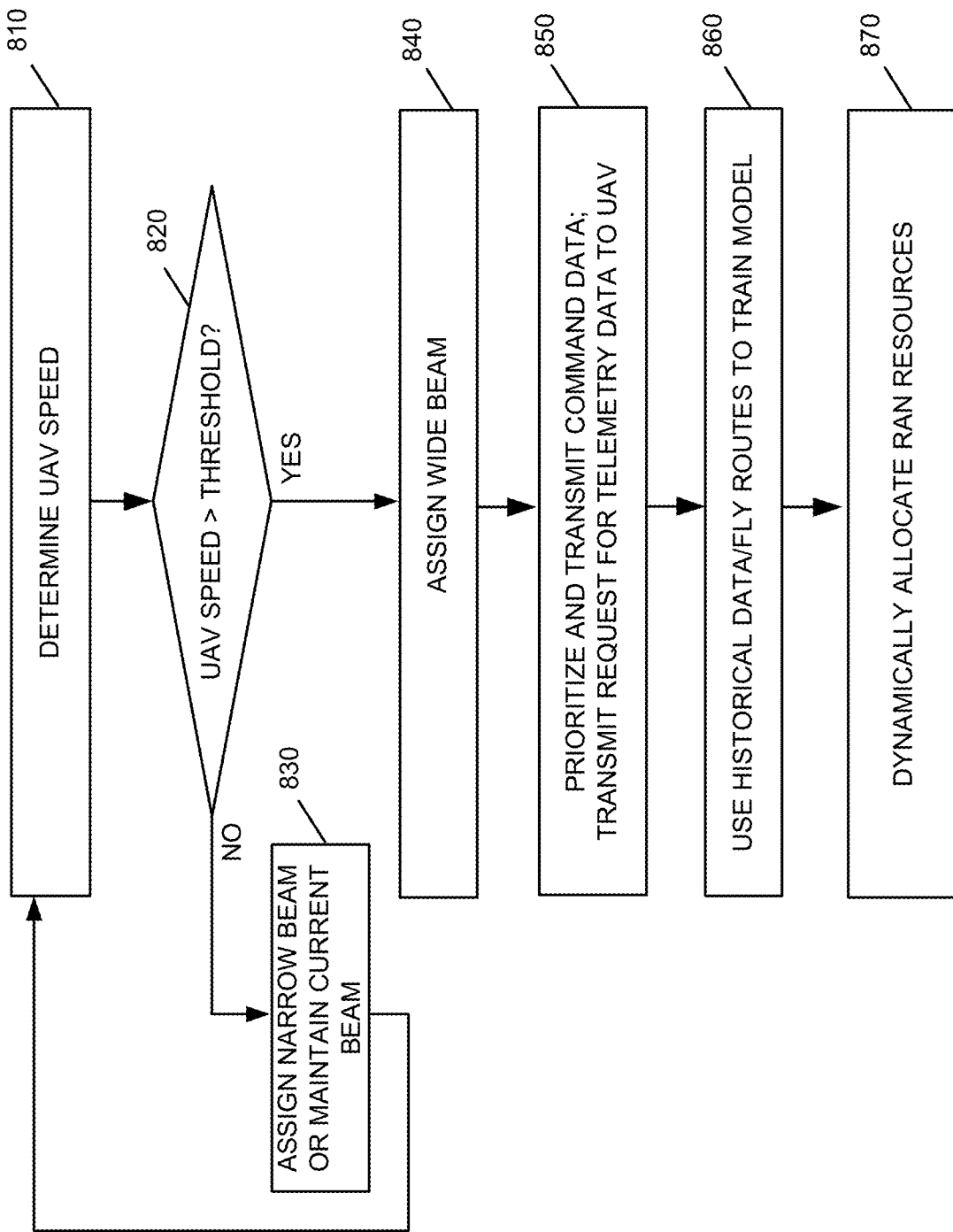
FIG. 8 is a flow diagram illustrating tracking a UAV and allocating resources to support the UAV in accordance with an exemplary implementation.

FIG. 8 illustrates beam management in environment 100 in accordance with an exemplary implementation. Processing may begin with determining the speed of UAV 110 (block 810). For example, UAV movement tracking logic 330 may determine the current speed of UAV 110. For example, UAV movement tracking logic 330 may determine the speed, direction, and/or distance of the UAV 110 from base station 120 based on the beam ID and signal strengths of particular antenna beams measured by the particular UAV 110. UAV movement tracking logic 330 may also determine if the speed is greater than a threshold speed (block 820). If the speed of UAV 110 is not greater than the threshold (block 820—no), beam selection logic 340 may assign a narrow beam to UAV 110 or maintain the current beam assigned to UAV 110 (block 830).

If, however, the speed of UAV 110 is greater than the threshold (block 820—yes), beam selection logic 340 may assign a wider beam to UAV 110 (block 840). For example, beam selection logic 340 may signal beamforming logic 310 to generate a wider beam and transmit the wider beam to UAV 110 based on the determined speed, as well as location and altitude of UAV 110. UAV 110 may detect the wider beam and signal base station 120-1 that the wider beam has adequate signal strength to service UAV 110.

Based on the particular network slice assigned to UAV 110, base station 120 may also prioritize command data to be transmitted to UAV 110 over other types of data (block 850). For example, base station 120-1 may transmit command data received from a user device remotely controlling UAV 110 in real time or near real time to UAV 110 (block 850). The command data may be used to control UAV 110, such as a flight path for UAV 110. Base station 120 may also prioritize and transmit a request for telemetry data from UAV 110 (block 850).

UAV 110 may transmit the telemetry data associated with UAV 110's flight to base station 120. Base station 120 may forward the telemetry data to network slice manager 130, SMO module 135 and/or other devices in provider network 150. For example, SMO module 135 may use the historical flight data to train a model associated with flights of UAVs 110 (block 860). For example, for a commercial UAV 110 delivering packages from a warehouse to a particular region, SMO module 135 may use artificial intelligence/machine learning to train a model to track flights of UAVs 110 over a period of time and identify likely destinations. Such training may aid network slice manager 130 in assigning appropriate slices for UAVs 110. Such training may also allow SMO module 135 to dynamically assign and allocate RAN resources to UAV 110 based on the flight, such as perform beam management for UAV 110 (block 870).

Figure 9:
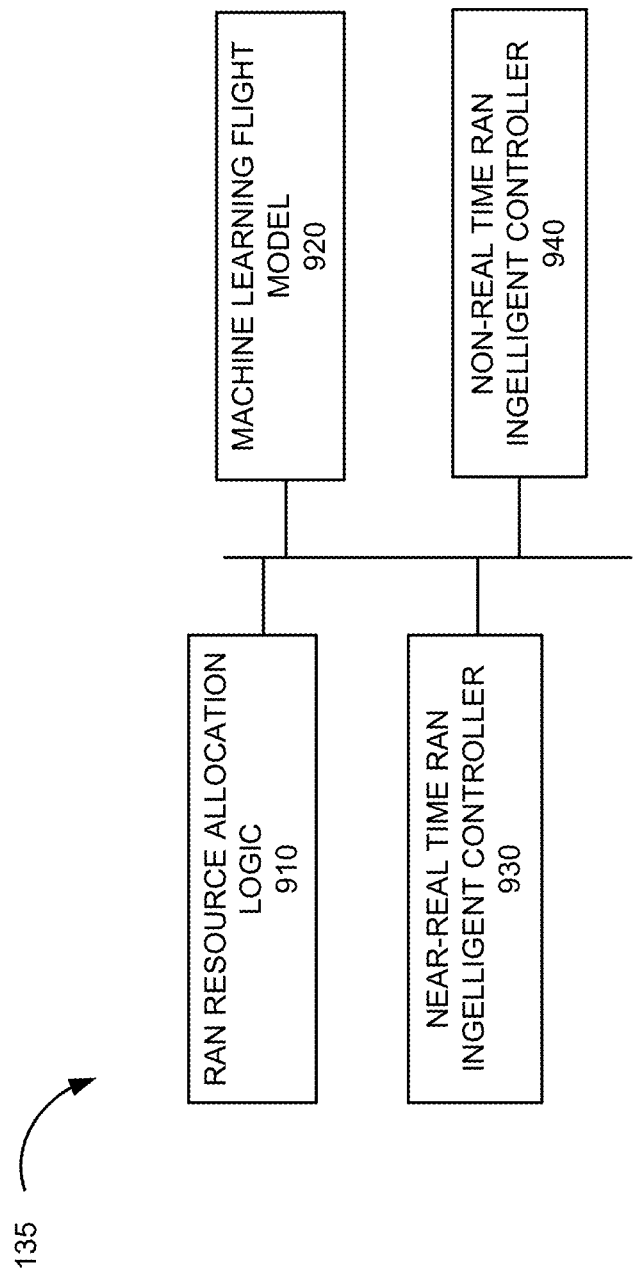
FIG. 9 illustrates exemplary logic components implemented in the service management and orchestration module of FIG. 1 in accordance with an exemplary implementation.

FIG. 9 illustrates SMO module 135 in accordance with an exemplary implementation. In some implementations, SMO module 135 may be part of a self-organizing network (SON) system. Referring to FIG. 9, SMO module 135 may include RAN resource allocation logic 910, machine learning flight model 920, near-real time RAN intelligent controller (MC) 930 and non-real time RAN intelligent controller 940. These elements may be implemented by processor 220 executing instructions stored in memory 230 of SMO module 135. In alternative implementations, these components or a portion of these components may be located externally with respect to SMO module 135.

RAN resource allocation logic 910 may allocate RAN resources, such a particular base stations 120, particular antenna beams at particular base stations 120, etc., based on information obtained from machine learning flight model 920. For example, machine learning flight model 920 may take historical telemetry data and data usage information associated with flights of UAVs 110 and use artificial intelligence/machine learning to predict flight path/routes associated with particular UAVs 110. For example, a particular UAV 110 may fly from a distribution warehouse to a destination at regular intervals. Machine learning flight model 920 may use that historical data to predict a flight path for that particular UAV 110 at a later time. Machine learning flight model 920 may also use historical data usage information associated with data transmitted to/from UAV 110 to identify likely points in flights when higher data usage is needed. For example, machine learning flight model 920 may predict that UAV 110 will be transmitting image data for a developer/builder when UAV 110 is located at a particular location (e.g., over a new building site). In this case, RAN resource allocation logic 910 may use the predicted flight path and data usage to allocate RAN resources. RAN resource allocation logic 910 may also signal slice manager 130 to dynamically assign a new slice to UAV 110 when UAV 110 is expected to transmit large amounts of data. For example, UAV 110 may be assigned a lower bandwidth beam and/or network slice to maintain connectivity during a flight, and be dynamically re-assigned a higher bandwidth beam and/or network slice when data usage is expected to increase.

Near-real time RIC 930 may include logic to dynamically apply RAN resources to service UAVs 110 in flight. For example, RAN resource allocation logic 910 may signal near-real time RIC 930 and dynamically allocate RAN resources to a UAV 110 on a particular flight. For example, while a UAV 110 is in flight, near-real time RIC 930 may determine that a wider beam is needed to support UAV 110 to avoid UAV 110 frequently switching between beams. Similarly, RAN resource allocation logic 910 may signal non-real time RIC 940 and dynamically allocate RAN resources to UAV 110 that may be on the ground or operating in a recreational mode. For example, non-real time RIC 940 may determine that a narrower beam is needed for a stationary UAV 110 or UAV 110 that is moving slowly.

In some implementations, power/battery resources for UAVs 110 is a factor when flying UAVs 110 a relatively long distance or for a long period of time. In such situations, a UAV 110 be serviced using, for example, using both 5G and 4G LTE protocols. For example, UAV 110 may be serviced from a dual connectivity base station 120 that includes both 4G LTE and 5G communication capabilities. In such a case, flight telemetry data, which generally has a low bandwidth requirement may be transmitted to base station 120 at a low power level (e.g., using a low power modulation and coding (MCS) scheme associated with, for example, a 4G LTE protocol), while higher bandwidth transmissions, such as video images, may be transmitted to base station 120 using a 5G protocol (e.g., using millimeter wave frequencies).

Implementations described allow a service provider to detect UAVs and assign network slices to UAVs based on the particular UAV. This allows UAV operators to be assured of having adequate network connectivity and telecommunications services while the UAV is flying. Implementations described herein also allow a service provider to select appropriate base stations and antenna beams to support UAVs in flight. This allows service providers to optimize use of network resources while also ensuring telecommunications support for UAVs.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to network slice manager 130 and SMO module 135 being separate devices/module. In other implementations, network slick manager 130 and SMO module 135 may be part of the same system/platform.

In addition, in some implementations, base station 120, network slice manager 130 and/or SMO module 135 may determine if a particular UAV 110 has adequate radio frequency resources (e.g., particular antennas) before assigning network slices and/or providing various antenna beams to service the particular UAV 110 to avoid providing a network slice and/or antenna beam that would not be fully utilized by the UAV 110. This may enable the service provider to further optimize use of network resources.

Further, while series of acts have been described with respect to FIGS. 7 and 8, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A system, comprising:
at least one device comprising a processor, wherein the at least one device is configured to:
transmit multiple antenna beams to an unmanned aerial vehicle (UAV), receive, from the UAV, information identifying one of the multiple antenna beams and signal strength information measured by the UAV for the one antenna beam, wherein the signal strength of the one antenna beam has a highest signal strength of the multiple antenna beams measured by the UAV, determine a location of the UAV based on the received information identifying the one of the multiple antenna beams and the received signal strength information, determine a speed of the UAV based on at least one of the signal strength information measured by the UAV for the one antenna beam and received from the UAV, or timing advance information received from the UAV, identify a network slice to service the UAV based on the location of the UAV, assign the identified network slice to the UAV, and perform antenna beam management for the UAV while the UAV is in flight, wherein when performing antenna beam management, the at least one device is configured to:

identify an antenna beam to service the UAV based on the determined speed.

2. The system of claim 1, wherein when performing antenna beam management, the at least one device is further configured to:

dynamically assign an antenna beam to the UAV while the UAV is in flight based on at least one of the speed or location of the UAV, and wherein when identifying a network slice, the at least one device is further configured to identify the network slice based on at least one of a quality of service level or service level agreement for a user associated with the UAV.

3. The system of claim 1, wherein when determining the speed of the UAV, the at least one device is further configured to:

determine the speed of the UAV based on the timing advance information received from the UAV.

4. The system of claim 1, wherein when performing antenna beam management, the at least one device is further configured to:

assign a first antenna beam having a first width to service the UAV when the speed of the UAV is above a threshold, and assign a second antenna beam having a second width when the speed of the UAV is below the threshold, wherein the first width is greater than the second width.

5. The system of claim 1, wherein the at least one device is further configured to:

receive telemetry information associated with flights of a plurality of UAVs, and train, using machine learning, a model associated with tracking flights of the plurality of UAVs using the received telemetry information.

6. The system of claim 1, wherein when identifying the network slice, the at least one device is further configured to:

determine information corresponding to at least one of a type of UAV, a use associated with the UAV, a quality of service (QOS) level or service level agreement (SLA) for a subscriber associated with the UAV, or a historic level of data usage associated with the UAV, and identify the network slice based on the determined information.

7. The system of claim 1, wherein the at least one device is further configured to:

prioritize certain types of data to be transmitted to and from the UAV, and provide network resources to support the prioritization.

8. The system of claim 1, wherein the at least one device comprises a base station and a network slice manager.

9. The system of claim 8, wherein the network slice manager is configured to:

identify the network slice based on historical data associated with a plurality of UAVs.

10. The system of claim 1, wherein the at least one device is further configured to:

dynamically change the network slice assigned to the UAV while the UAV is in flight based on data usage requirements associated with the UAV.

11. The system of claim 1, wherein the at least one device is further configured to:

determine, prior to assigning the identified network slice, whether the UAV is located on the ground.

12. The system of claim 1, wherein the at least one device is further configured to:

determine, prior to assigning the identified network slice, radio resources associated with the UAV, and when assigning the identified network slice, the at least one device is further configured to:

assign the identified network slice based on the determined radio resources.

13. A method, comprising:

transmitting multiple antenna beams to an unmanned aerial vehicle (UAV);

receiving, from the UAV, information identifying one of the multiple antenna beams and signal strength information measured by the UAV for the one antenna beam, wherein the signal strength of the one antenna beam has a highest signal strength of the multiple antenna beams measured by the UAV;

determining a location of the UAV based on the received information identifying the one of the multiple antenna beams and the received signal strength information;

determining a speed of the UAV based on at least one of the signal strength information measured by the UAV for the one antenna beam and received from the UAV, or timing advance information received from the UAV;

identifying, based on the location of the UAV and at least one of a quality of service level or service level agreement for a user associated with the UAV, a network slice to service the UAV;

assigning the identified network slice to the UAV; and performing antenna beam management for the UAV while the UAV is in flight, wherein performing antenna beam management comprises:

identifying an antenna beam to service the UAV based on the determined speed.

14. The method of claim 13, wherein performing antenna beam management comprises:

dynamically assigning an antenna beam to the UAV while the UAV is in flight based on the speed or location of the UAV.

15. The method of claim 13, wherein the determining the speed further comprises:

determining the speed of the UAV based on the timing advance information received from the UAV.

16. The method of claim 13, wherein performing antenna beam management comprises:

assigning a first antenna beam having a first width to service the UAV when the speed of the UAV is above a threshold, and assigning a second antenna beam having a second width when the speed of the UAV is below the threshold, wherein the first width is greater than the second width.

17. The method of claim 13, further comprising:
prioritizing certain types of data to be transmitted to and from the UAV; and
providing network resources to support the prioritization.

18. The method of claim 13, further comprising:
dynamically changing the network slice assigned to the UAV while the UAV is in flight based on data usage requirements associated with the UAV.

19. A non-transitory computer-readable medium having stored thereon sequences of instructions which, when executed by at least one processor, cause the at least one processor to:
receive, from an unmanned aerial vehicle (UAV), information identifying one of multiple antenna beams and signal strength information measured by the UAV for the one antenna beam, wherein the signal strength of the one antenna beam has a highest signal strength of the multiple antenna beams measured by the UAV;
determine a location of the UAV based on the received information identifying the one of the multiple antenna beams and the received signal strength information;
determine a speed of the UAV based on at least one of signal strength information measured by the UAV and received from the UAV, or timing advance information received from the UAV;
identify a network slice to service an unmanned aerial vehicle (UAV), wherein when identifying the network slice, the instructions cause the at least one processor to:
identify the location of the UAV,
determine least one of a quality of service level (QoS) or service level agreement (SLA) for a user associated with the UAV, and
identify the network slice based on the identified location and the determined at least one of the QoS or SLA;
assign the identified network slice to the UAV; and
perform antenna beam management for the UAV while the UAV is in flight,
wherein when performing antenna beam management, the instructions further cause the at least one processor to:
identify an antenna beam to service the UAV based on the determined speed.

20. The non-transitory computer-readable medium of claim 19, wherein when determining the speed of the UAV, the instructions further cause the at least one processor to:
determine a speed of the UAV based on the timing advance information received from the UAV.

* * * * *